(12) United States Patent
Huusko et al.

(10) Patent No.: US 6,397,065 B1
(45) Date of Patent: May 28, 2002

(54) CELLULAR RADIO ACCESS NETWORK AND LOCATION UPDATING IN A CORDLESS COMMUNICATIONS SYSTEM

(75) Inventors: Sami Huusko; Heikki Lindholm; Heikki Einola, all of Espoo; Juha Bäck, Helsinki; Seppo Huotari; Lauri Lahtinen, both of Espoo; Raili Numminen, Tampere; Lauri Söderbacka, Espoo; Juha Timonen, Aulin; Markku Verkama, Hakamäki, all of (FI)

(73) Assignee: Nokia Telecommunications Oy, Espoo (FI)

( * ) Notice: Subject to any disclaimer, the term of this patent is extended or adjusted under 35 U.S.C. 154(b) by 0 days.

(21) Appl. No.: 09/367,606

(22) PCT Filed: Feb. 17, 1998

(86) PCT No.: PCT/FI98/00144

§ 371 (c)(1),
(2), (4) Date: Dec. 7, 1999

(87) PCT Pub. No.: WO98/37721

PCT Pub. Date: Aug. 27, 1998

(30) Foreign Application Priority Data

Feb. 19, 1997 (FI) .................................................. 970705
Feb. 16, 1998 (FI) .................................................. 980351

(51) Int. Cl.[7] .............................................. H04Q 7/20
(52) U.S. Cl. ........................ 455/435; 455/426; 455/432; 455/433; 455/436
(58) Field of Search ................................ 455/426, 443, 455/432, 433, 435, 436, 3.01

(56) References Cited

U.S. PATENT DOCUMENTS 5,361,396 A    11/1994  Onoe et al.
5,826,188 A    10/1998  Tayloe et al.
5,835,061 A  * 11/1998  Stewart ...................... 342/457

FOREIGN PATENT DOCUMENTS

| | | |
|---|---|---|
| EP | 475 865 | 3/1992 |
| EP | 612 686 | 10/1994 |
| EP | 700 167 | 3/1996 |
| FI | 98694 | 4/1997 |
| WO | 92/08327 | 5/1992 |
| WO | 93/16560 | 8/1993 |
| WO | 94/06219 | 3/1994 |
| WO | 94/07337 | 3/1994 |
| WO | 94/13114 | 6/1994 |
| WO | 95/11577 | 4/1995 |
| WO | 95/28063 | 10/1995 |
| WO | 96/07277 | 3/1996 |

* cited by examiner

*Primary Examiner*—Lee Nguyen
(74) *Attorney, Agent, or Firm*—Pillsbury Winthrop LLP (57) ABSTRACT

A cellular radio access network and a location updating in a cordless communications system, in a cellular radio access network (1), which is connected to one or more core networks (2, 3, 4, 5) or services (SP2 to SP5), each of them having a dedicated mobility management. In a cell, identities of all those location areas are broadcast to which said cell belongs. A subscriber terminal (MS) sends to the radio access network only one location updating message irrespective of how many core networks (2, 3, 4, 5) or services (SP2 to SP5) have a simultaneously changing location area at a handover from one cell to another. On the basis of the information contained in the location updating message, the network (1) defines the core networks or services and location areas to which the location updating applies and sends a location updating message informing the new location of the subscriber or the subscriber terminal separately to each defined core network or service.

17 Claims, 4 Drawing Sheets

SEARCH TABLE

Fig. 4

| CORE NETWORK CN2 (SERVICE SP2) | CORE NETWORK CN3 (SERVICE SP3) | | | | CORE NETWORK CN4 (SERVICE SP4) |
|---|---|---|---|---|---|
| LA2.1 | LA3.1 | LA3.2 | LA3.3 | LA3.4 | LA4.15 |
| LA2.2 | LA3.5 | LA3.6 | LA3.7 | LA3.8 | |
| LA2.3 | LA3.9 | LA3.10 | LA3.11 | LA3.12 | |
| LA2.4 | LA3.13 | LA3.14 | LA3.15 | LA3.16 | |
| LA2.6 | | | | | |

SEARCH TABLE

| CELL | CORE NETWORK CN2 (SERVICE SP2) | CORE NETWORK CN3 (SERVICE SP3) | |
|---|---|---|---|
| C1 | LA2.1 | LA3.1 | |
| C2 | LA2.2 | LA3.2 | |
| C3 | LA2.3 | LA3.3 | |
| C4 | LA2.4 | LA3.4 | |
| | | | |

Fig. 7

CONVERSION TABLE

| GRAN | CORE NETWORK CN2 (SERVICE SP2) |
|---|---|
| $LA_{id_1}$ | $LA\_ID_{112}$ |
| $LA_{id_2}$ | $LA\_ID_{109}$ |
| $LA_{id_3}$ | |

Fig. 8

CELLULAR RADIO ACCESS NETWORK AND LOCATION UPDATING IN A CORDLESS COMMUNICATIONS SYSTEM

FIELD OF THE INVENTION

The invention relates generally to mobility management in cordless communications systems and specifically to location updating in a cellular radio access network.

BACKGROUND OF THE INVENTION

Currently under development are third generation mobile communications systems, such as the Universal Mobile Communication System (UMTS) and the Future Public Land Mobile Telecommunication System (FPLMTS), which has later been renamed as IMT-2000 (International Mobile Telecommunication 2000). The UMTS is under standardization at European Telecommunication Standards Institute (ETSI), while the International Telecommunication Union (ITU) is standardizing the IMT-2000 system. These future systems are very similar in their basic features. In the following, the UMTS system will be dealt with in more detail.

Like all mobile communications systems, the UMTS provides cordless data transmission services for mobile users. The system supports roaming, in other words, UMTS users can receive and make calls anywhere, as long as they are located within the UMTS coverage area. The UMTS is anticipated to satisfy a wide variety of future service needs, such as high-speed data services (multimedia), and video services, such as video calls. Many future services that will be needed are difficult to envision today. The use of the different services is also difficult to forecast, for which reason it is not possible to optimize the UMTS to one group of services only. One conclusion from this is that the UMTS must be constructed to be versatile and to permit further development. For this reason, a modular approach of the network architecture has been adopted, making it possible to implement the UMTS effectively in different environments.

Figure 1:
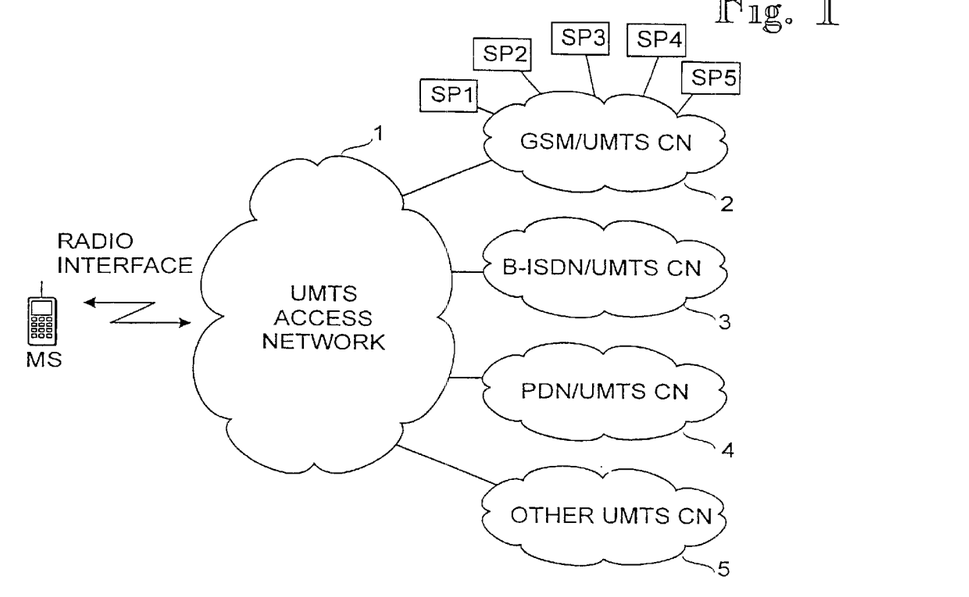
FIG. 1 illustrates generally a UMTS access network and core networks and service providers connected to it.

In the present perception, UMTS is built up of two or three parts that are illustrated in FIG. 1: a UMTS access network 1 (or a UMTS base station system, UMTS-BSS) and a core network 2, 3, 4 and 5. In the following, the UMTS access network will also be generally termed a radio access network. The UMTS access network 1 is mainly responsible for things related to the radio path, i.e. it offers to a core network a radio access that is needed for cordless operation. The core network 2, 3, 4 or 5 is a conventional or future telecommunications network modified to effectively utilize the UMTS access network in cordless communication. Telecommunications networks that have been contemplated as suitable core networks include second generation mobile communications systems, such as GSM (Global System for Mobile Communication), ISDN (Integrated Services Digital Network), B-ISDN (Broadband Integrated Services Digital Network), packet data networks PDN (Packet Data Network), ATM (Asynchronous Transfer Mode), and so on.

Accordingly, the UMTS access network must be capable of providing support to various core networks, also those evolving in the future. Likewise, UMTS access networks should permit connection of various radio interfaces to a core network (narrow-band, broadband, CDMA, TDMA, etc.). Several service providers SP2 to SP5 providing different services to UMTS subscribers may be connected to the core networks 2 to 5. The core networks mainly produce bearer capabilities and the service providers SP may define their own services utilizing these bearer capabilities. In theory, the core network shall be capable of supporting services defined by any SP. This contributes to the possibility of the user being connected to one core network and being simultaneously active in different services of different service providers. The UMTS access network may also be simultaneously connected to several core networks. Consequently, the access network must be capable of supporting different core networks and/or services and their subscribers simultaneously.

One of the most important demands on cordless communication is subscriber mobility management. Because a subscriber does not have a fixed access point at cordless communication, information on a subscriber's location at each moment must be maintained with a suitable accuracy in the registers of the network. The location data may tell for instance the subscriber's present cell, but preferably it indicates the subscriber's present location area comprising several cells. At a cell or location area handover, the mobile station always sends the network a location updating request, which causes an updating of location data in the registers of the network. By using larger location areas, the load caused by location updatings on the radio path can be reduced. A drawback is that paging messages have to be sent the mobile station in all cells of the location area. The size of the location area generally is a compromise between location updating signalling and paging signalling.

As stated above, the UMTS access network may be connected to more than one core network CN or the UMTS subscriber may be active in several services. Each core network may have a dedicated mobility management protocol (MM) and dedicated location areas (LA). Likewise, each service may have a dedicated location management. For this reason, the UMTS access network has to send location area identities of all core networks CN on its signalling channel. Thus each subscriber terminal, being active in one or more core networks, may monitor the broadcast location area identities of the desired core network/networks and send a location updating message to the access network when moving across the boundary of some location area. If the boundary of the location area of several different core networks is crossed simultaneously, the subscriber terminal has to send many location updating messages over the air interface, one for each core network and/or service involved. This causes significant signalling load over the radio interface. This is against normal planning objectives trying to minimize the amount of MM messages and the signalling over the radio interface in general.

At the development of the UMTS access network, an open question is how a uniform MM protocol supporting different core networks CN and services can be implemented therein and how the amount of MM messages especially over the radio interface can be minimized. An idea has been presented that the very UMTS access network should comprise some kind of a subscriber register, in which location data are managed. Even such thoughts have been presented that an access network cannot operate without dedicated registers. However, registers require dedicated interfaces in the core networks CN or to an intelligent network IN. In addition, a specific mobility management protocol should be standardized in the access network. If separate registers could be left out, standardizing and planning work would be saved, and moreover, radio access network products would be simpler and cheaper.

DISCLOSURE OF THE INVENTION

An object of the invention is to minimize the location updating signalling to be sent over the radio interface in the systems described above.

Another object of the invention is to avoid separate subscriber registers in a radio access network.

A feature of the invention is location updating methods according to claim 1 and 16.

Another feature of the invention is cellular radio access network according to claim 10.

A radio access network is connected to one or more core networks or services, each of them having dedicated location areas and/or location management protocols. Each cell of the radio access network sends identities of those location areas to which the cell in question belongs. A subscriber terminal monitors the broadcast location area identities and sends a location updating message to the radio access network or a core network at a handover from an old cell to a new cell, if some of the location area identities broadcast by the new cell differs from the location area identities broadcast by the old cell, the old location area identities being stored in the subscriber terminal. In the invention, the subscriber terminal sends, however, only one location updating message, irrespective of how many core networks have a simultaneously changing location area or how many different services or core networks the location updating concerns, when the subscriber terminal moves from one cell to another. On the basis of the information contained in the location updating message, the radio access network or the core network supporting said services determines the mobility managments, i.e the core networks or services, and/or location areas to which the location updating applies. Subsequently, the radio access network or the core network sends an information on the new location of the subscriber or the subscriber terminal separately to each concerned core network or service. This information can preferably be sent as a (service-specific or core network-specific) location updating message in accordance with the mobility management protocol of the core network or service. By means of the invention, the amount of location updating messsages at the radio interface can be restricted to one, regardless of the real amount of location updatings to be performed in the core networks or to the service providers. In practice, this signifies a considerable saving of the radio interface capacity. This saving is achieved irrespective of whether the radio access network has dedicated subscriber registers or not. However, the location updating according to the invention makes the implementation possible also without subscriber registers. The only feature to be required of the radio access network, or a core network, is the capability of deriving from one location updating message an information on those core networks or services and/or location areas to which the location updating applies and to send the information forward to the concerned core networks or service providers. Anyway, this does necessarily not require subscriber-specific operations or registers in the radio access network, but only some kind of a modification of a location updating message of the radio access network to location updating messages of the core networks or services. At the most, that modification requires simple tables or data records having a fixed content. Dynamic subscriber-specific data and thus subscriber registers are not necessary for the invention.

In an embodiment of the invention a location updating message sent by a subscriber terminal contains at least the identity of one changed location area. Then the radio access network checks in a search table or a similar stored data structure, whether this change of one location area of a core network or service also signifies that the location area of some other core network or service has changed. In other words, the search table or the like tells the connections between the location areas of the different core networks or services. If the subscriber terminal crossed (besides the boundary of the location area of the informed core network or service) also the boundary of the location area of some other core network, the radio access network obtains the new location areas of these other core networks or services from the search table and sends the location updating data to the concerned core networks or service providers.

In an embodiment of the invention, a location updating message sent by a subscriber terminal contains, in addition to the new location area of one core network or service, also an information on the other core networks or services to which the location updating applies. This information may be a subscriber identity for each respective core network and/or service. Then the radio access network retrieves by means of said one location area the new location areas of the other core networks informed by the subscriber terminal from the search table or the like. The information of the subscriber terminal is based, in turn, on its own observation of changing location areas of said core networks. This embodiment makes it possible to avoid, also subscriber-specifically, unnecessary location updatings in core networks or services where a subscriber terminal or a subscriber is not active at the moment. This is possible, because the subscriber terminal typically contains an information on in which core networks or services it is subscribed to or active in such a way that a location updating should be performed in the core network or service. When this information is transferred in a single location updating message to the radio access network, and the location updating is carried out in the indicated core networks or services, the location updating process can be optimize subscriber-specifically without the radio access network needing dynamic subscriber data.

In an embodiment of the invention, a location updating message sends the identities of all those location areas which have changed. No search table of the above type is then absolutely necessary in the radio access network, but only the capability of sending a new location area information in correct form to the concerned core networks or service providers. However, a drawback of this approach consists in considerably long location updating messages over the radio interface, which contributes to increasing signalling load. It is even possible that the capacity defined for the location updating message in the radio access network is not sufficient for transferring all location area data at a time.

If the location areas of different core networks are defined to completely overlap irrespective of each other, the search table or the like may also contain some information on the overlap of the location areas, with an accuracy of one cell or base station, for instance. The information on the cell or base station through which the location updating message is received is normally at disposal in the radio access network, and therefore, it is not necessary to transfer it over the radio interface.

However, the operator of the radio access network has the cell structure of the radio access network completely under control, and therefore, he can usually freely determine which cells belong to which location area. Restrictions, if any, may be for instance recommendations and needs of networks for the size of location areas, or for instance the nature of the traffic in core networks (location area must be optimized for packet data or speech, for example). For this reason, the boundaries of the location areas of the different core networks or services are defined in a preferred embodiment of the invention in such a way that, on the basis of one location area of a core network changing, the possibly changed location areas of the other core networks or services can be defined unequivocally. In the most preferred approach, the location areas of different size of the core networks are defined nested in such a way that smaller location areas of one core network or service always lie within larger location areas of another core network. On the basis of the smaller (smallest) location area, for instance, it is then possible to define unequivocally the larger location areas situated at the same place. Such a structure also reduces the need for location updatings at different times, which again reduces the signalling load over the radio interface further.

In a further embodiment of the invention, the radio access network uses for the location area identities of a core network different from those used in the core network. In other words, the radio access network can have an identity format of location areas completely independent of the core network, A need for such a solution may arise for instance from that the identity format used in the radio access network does not fit the field of the location updating message of the core network, or vice versa. The radio access network performs a modification between the different identity formats and may for this purpose comprise a table containing a description of the identity of the location area of the radio access network up to the identity used by the core network, and vice versa. An opposite measure is required for sending paging messages to the subscriber terminal.

In the same way, it is possible that the location area structure (cell structure) of the radio access network somewhat differs from the location area structure of the core network. Then the radio access network may have a table or the like, on the basis of which the cell or location area structure of the radio access network is described to the location area structure of the core network, and vice versa. In some situation, such a solution may give the operator of the radio access network more liberty of optimizing the signalling of the radio access network, irrespective of the paging properties of the core network, for instance.

In an embodiment of the invention, in which a location updating should be performed in two or more services of one or more service providers, belonging to the same core network, the only one location updating message sent by a subscriber terminal can be guided to said core network. In said core network, it is then defined on the basis of the content of the location updating message to which services the location updating applies, and separate location updating messages are sent to the corresponding service providers. Said one location updating message may contain for instance a separate subscriber identity for each service, whereby the services to which the location updating applies can be defined on the basis of these identities.

BRIEF DESCRIPTION OF THE DRAWINGS

In the following, the invention is described in more detail by means of preferred embodiments with reference to the attached drawings, where.

DETAILED DESCRIPTION OF THE INVENTION

Preferred embodiments of the invention will be described in the following as implemented in a radio access network in accordance with the principles of the UMTS system, but the intention is not to restrict the invention to the UMTS system. The invention is suitable for use in any radio access network that is connected to one or more core networks (data communications systems) and/or to one or more services having dedicated mobility managements. One service provider has one or more services, which are offered to UMTS subscribers. Generally, each service has a dedicated subscriber indentity, and therefore dedicated mobility management and subscriber register(s). However, the service providers or services do no typically have location areas of their own, but use the bearer capabilities of the underlaying core network. The examples below, however, describe embodiments comprising both several core networks and several services in parallel. User of a subscriber terminal MS may be a subscriber to one or more services, i.e. have one or more different subscriber identities, of one or more service providers. The user may even have a double subscribership with a single service, i.e have two (or more) subscriber identities to a same service.

Figure 2:
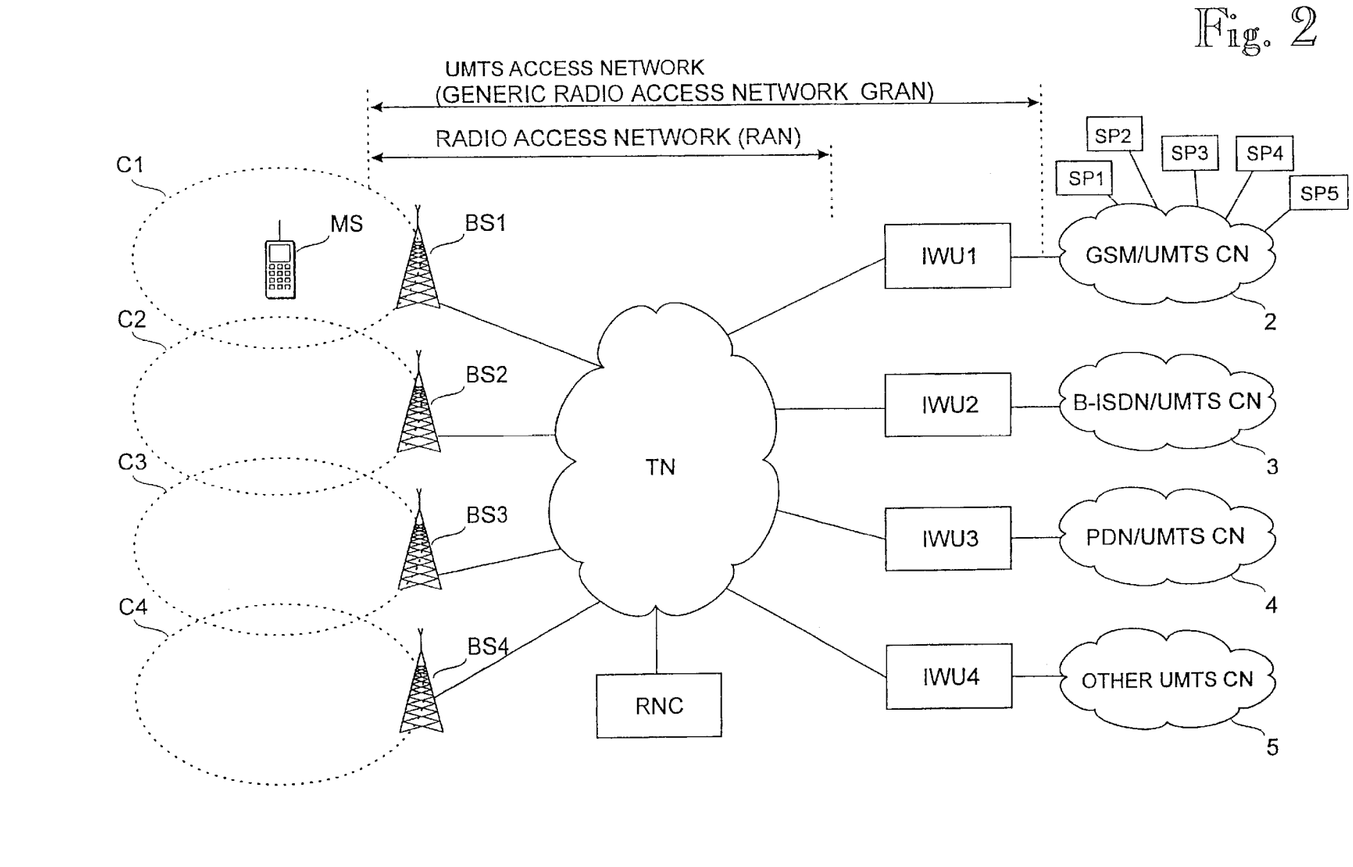
FIG. 2 is a diagram illustrating one possible structure of the UMTS access network in greater detail.

FIG. 2 shows a network architecture of a UMTS access network in more detail. Anyway, it is to be noted that this network architecture is only one of many alternatives. The network architecture shown in FIG. 2 is based on a scenario according to which the functions of the UMTS access network are closely limited to radio access functions. Thus, it mainly comprises functions for radio resource control (handover, paging) and for controlling the bearer service (control of radio bearer service). More complicated modes of function, such as registers, registering functions and mobility and location management, are located in each core network or service providers. In a preferred embodiment of the invention for example, all signalling on account of location updatings is thought to be transmitted to the core networks or service providers, after the treatment according to the present invention.

In accordance with UMTS terminology, the entire UMTS access network is termed a Generic Radio Access Network (GRAN). The GRAN is further divided to a Radio Access Network (RAN) and to an Interworking Unit (IWU). As a rule, there is an IWU between each core network 2 to 5 and the RAN, such as IWUs 1 to 4 in the figure. The purpose of the IWU is a connection between the core network and the RAN. Therefore the IWU comprises the necessary adaptations and other possible interworking functions. The interface IWU-CN is core network-specific. This enables development of core networks and the RAN independently of one another. For example, the IWU may be connected to the base station system BSS of a GSM network. Likewise, an IWU2 may be connected to a local exchange of an ISDN network, for instance. FIG. 2 further shows service providers SP2, SP3, SP4 and SP5, which are connected to the core network CN2. In the example case, these services have different location areas.

In FIG. 1, the radio access network RAN comprises a Transport Network TN, a Radio Network Controller RNC, and a base station BS. In the network architecture shown, the base stations are connected to the transport network TN, which transports the user data to the IWUs and the control signalling to the radio network controller RNC. All intelligence controlling the GRAN is located at the base stations BS and the radio network controller RNC. As stated previously, this control is typically limited to control functions pertaining to radio access as well as to switching connections through the transport network TN. The transport network TN may be an ATM network, for example.

It is to be noted that the detailed structure of the UMTS access network is of no significance to the invention. For example, the network structure of FIG. 2 may also comprise subscriber registers. In this application, the term radio access network refers generally to any radio access network and network structure that is connected to one or more core networks and/or offers access through a core network to the services of one or more service providers.

Figure 3:
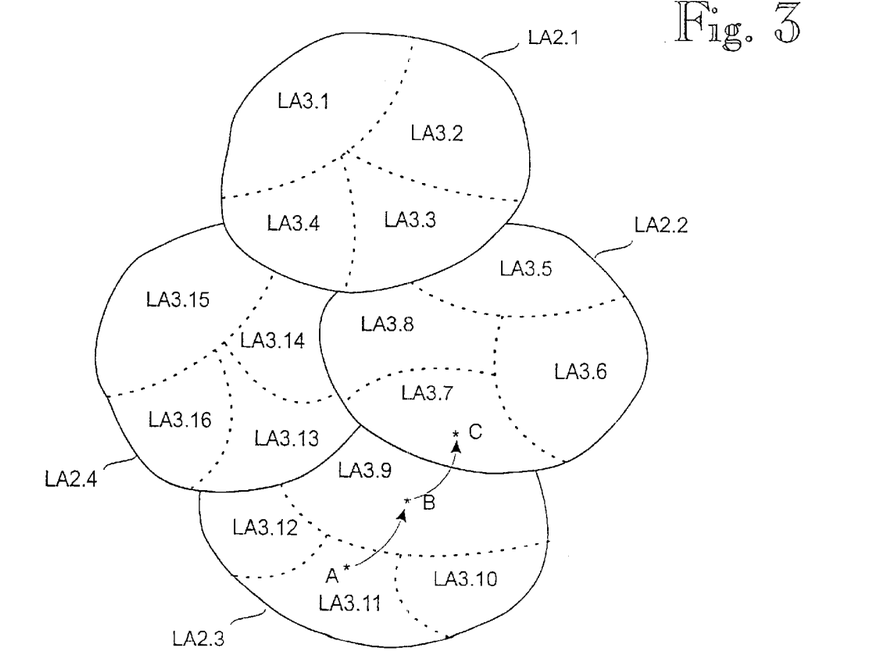
FIG. 3 shows a location area structure according to the invention, where the location areas of two core networks are nested.
Figure 5:
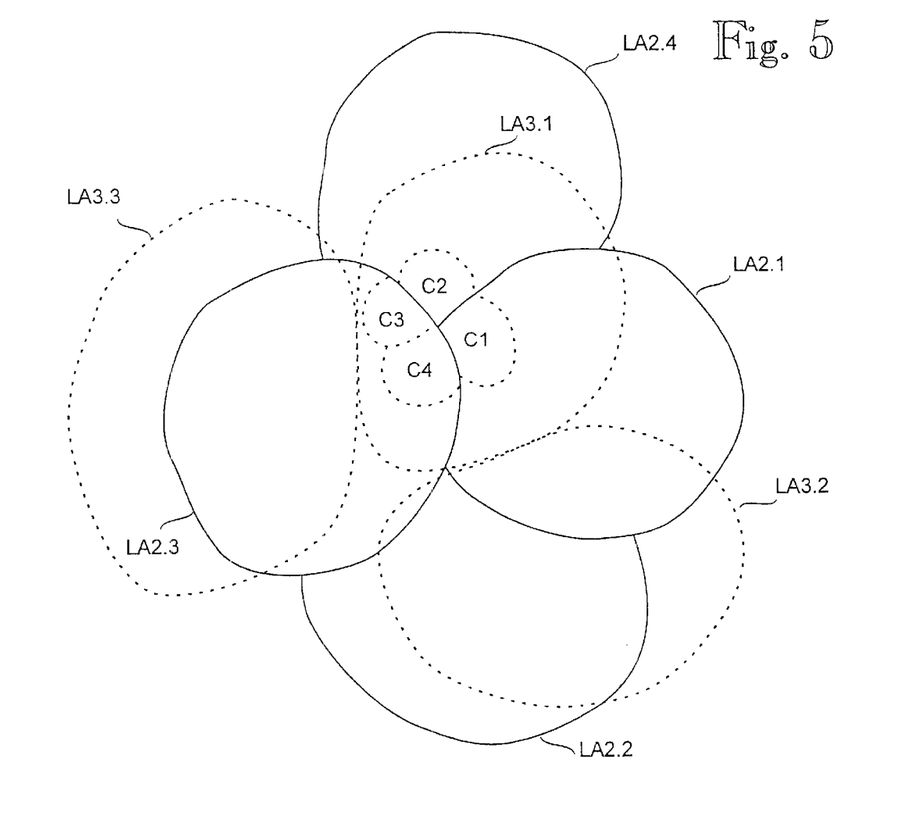
FIG. 5 shows a location area structure, where the location areas of the different core networks are located in an arbitrarily overlapping way.

FIG. 2 illustrates further how the coverage areas of base stations BS1, BS2, BS3 and BS4 form cells C1, C2, C3 and C4, respectively. By combining these physical radio cells having an accurate geographical location and size, it is possible to form different logic location areas LA. Actually, a location area LA is only a set of physical cells defined in the data base, the identity or the name of LA being termed location area identity. Because the location areas are logic, they can be defined arbitrarily in the cell structure of a radio access network. Additionally, there may be several, in principle an arbitrary amount of different location area levels (location areas of different size, for example) on each other. When each core network or service has its dedicated location areas, those can easily be described as dedicated location area levels in the cell structure of the radio access network. FIGS. 3 and 5 show two examples of how the location areas of the core networks 2 and 3 can be located on each other. Correspondingly, the location areas of the services of the service providers SP2 and SP3 or the location areas of the services of the core network 2 and the service provider SP3, for instance, could be located on each other.

Each base station BS broadcasts in a cell the location area identities of those location areas of all core networks or services to which said cell belongs. A subscriber terminal MS monitors at least the broadcast location area identities of the services of those core networks where it is active at said moment. At each cell or location area handover, the subscriber terminal, i.e. a mobile station MS, sends a location updating request to the radio access network, which request causes an updating of location data in the registers of the core network (or the radio access network) and, if necessary, in the registers of the service providers. As was stated previously, if the boundary of the location area of several different core networks or services is crossed simultaneously, the MS possibly has to send in this situation many location updating messages over the air interface, one for each core network or service.

In the present invention, this is avoided by sending only one location updating message, on the basis of which the radio access network is capable of defining those core networks or services and location areas to which the location updating applies.

In the following, an arrangement according to a preferred embodiment of the invention, implementing the above principle, is described. For the sake of clarity, the example uses the location areas of core networks 2 and 3 only, but in practice, the amount of location area levels may be arbitrary. With reference to FIG. 3, the location areas of the core networks 2 and 3 may be of different size and nested. To be precise, the location areas LA3.1 to LA3.16 of the core network 3 are located within the location areas LA2.1 to LA2.4 of the core network 2. The principle is that no one of the location areas LA3.1 to LA3.16 extends to the area of the location area LA2.1 to LA2.4 of two core networks. On the basis of the location area of the core network 3, it is thus possible to define unambiguously also the location area of the core network 2, which is situated at the same place in the cellular structure of the radio access network. A nested location area structure like this simplifies considerably the implementation of the present invention, as will be described below. In the same way, unequal location areas of two service providers, such as SP2 and SP3, may be located within each other, for instance.

Figure 4:
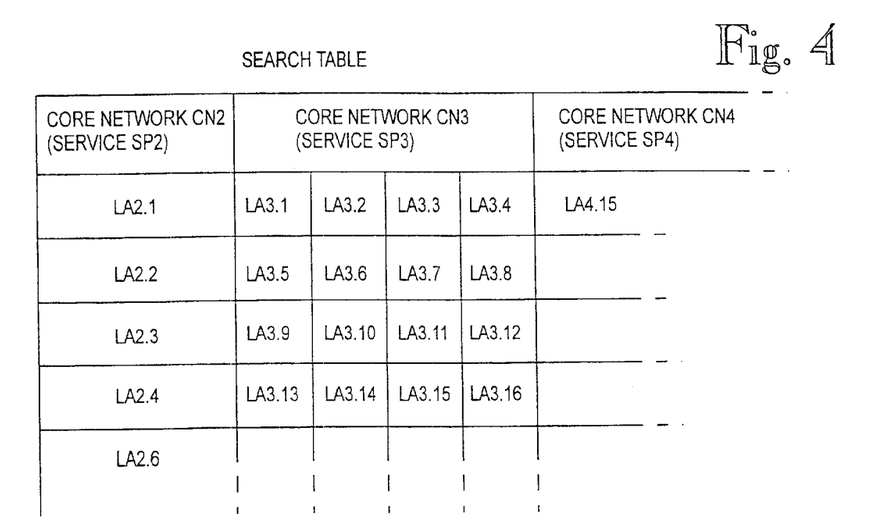
FIG. 4 shows a search table according to the invention.

The radio access network comprises according to the invention a search table or another similar data structure telling which location areas of the core network 3 (or service SP3) are within which location area of the core network 2 (or service SP3). An example of such a search table is shown in FIG. 4. Correspondingly, the amount of nested location area levels can be increased, through which the table expands further. From the table can, for instance, be seen that the location area LA3.10 is within the location area LA2.3 of the core network 2 (or service SP2).

Referring to FIG. 3, it is assumed initially that a mobile station MS moves from point A to point B. At point A, the location information on the mobile station MS (or a subscriber) in the core network CN2 (or in the location register of SP2) is the identity of the location area LA2.3 and in the core network CN3 CN2 (or in the location register of SP3) the identity of the location area LA3.11. When the MS moves from point A to point B, it crosses the boundary between the location areas LA3.11 and LA3.9 of the core network CN3 (or SP3). Upon observing the change of the location area, the MS sends a location updating message according to the invention, containing the new location area identity LA3.9 and the old location area identity LA3.11. The location updating message is transmitted from a base station BS to a radio network controller RNC, which in the preferred embodiment of the invention contains a search table according to FIG. 4. The RNC retrieves from the search table the location area identity LA2.3 of the core network CN2 (or SP2) corresponding to the new location area identity LA3.9 of the core network CN3 (or SP3). Correspondingly, the RNC retrieves from the search table the location area identity of the core network CN2 (or SP2), being the same LA2.3, corresponding to the old location area identity LA3.11 of the core network CN3 (or SP3). The RNC compares the new and the old location area identity of the core network CN2 (SP2) with each other, and because those are identical, concludes that no location updating is needed in the core network CN2 (or SP2). Correspondingly, the RNC may retrieve from the search table the location areas of the other core networks CN4 to CN5 (or services SP4 to SP5). It is assumed that the location area has not changed in them either. Then the RNC sends a general location updating message to the interworking unit IWU2, which is connected to the core network CN3 (or to the IWU1 offering access through the core network 2 to the service provider SP3). Because the location updating message sent by the RNC preferably has a general format, which is used within the radio access network, the IWU2 of the preferred embodiment of the invention changes the general location updating message to a form specified for the core network CN3 (or the IWU1 changes the location updating message to the form used by the SP3). The core network CN3 (or SP3) updates the new location area LA3.9 in the location data of the MS or the subscriber.

Referring to FIG. 3 again, it is assumed that the MS moves from point B to point C. The MS then crosses both the boundary between the location areas LA3.9 and LA3.7 of the core network CN3 (or SP3) and the boundary between the location areas LA2.3 and LA2.2 of the core network CN2 (or SP2). Upon observing the crossing of the boundary, the MS sends according to the invention only one location updating message containing the identity of the new location area LA3.7 and the identity of the old location area LA3.9 of the core network CN3 (or SP3). The location updating message is transmitted to the RNC again. The RNC retrieves from the search table of FIG. 4 the location area LA2.3 and LA2.2 of the core network CN2 (or SP2) corresponding to the new location area LA3.7 and the old location area LA3.9 of the core network CN3 (or SP3). The RNC compares the new and old location area of the core network CN2 (or SP2) with each other and concludes, upon observing a difference between them, that also the core network CN2 (or SP2) has to be updated. Subsequently, the RNC sends IWU2 (or IWU1) a general location updating message containing at least the identity of the new location area LA3.7. If necessary, the IWU2 changes the location updating message to the form used by the core network CN3 and sends it to the core network CN3, which updates the subscriber's location data (or IWU1 changes the location updating message to the form used by the SP3 and sends it through the core network CN2 to the SP3 that updates the subscriber's location data). Correspondingly, the RNC sends another general location updating message to IWU1, which is connected to the core network CN2. This general location updating message contains the new location area LA2.2 of the core network CN2 (or SP2). The IWU1 changes the general location updating message, if necessary, to the form used by the core network CN2 (or SP2) and sends the location updating message to the core network CN2 (or through the core network CN2 to SP2), which updates the subscriber's location data. Location updating is thus performed in two core networks or services by using only one location updating message on the radio path and without needing separate subscriber registers or location management functions in the radio access network. In the same way, an arbitrary amount of core networks and/or services can be location updated.

In the above example, the mobile station always sent the location area information on that core network or service which had the smallest location area structure. For enabling this, the mobile station may contain stored priority information telling the order in which the location areas of the core networks or services should be chosen to the location updating message. The MS may choose to the location updating message the core network or service having the highest priority in which it is active.

The location updating message sent by the mobile station MS may also contain an information on those core networks CN or service providers from the search table only the new location areas of the core networks or services in question. For example, the MS may tell the core networks or services where it has observed a change of location area and/or where it is active at that moment.

A location updating message may also contain the new location areas of all core networks or services. The search table of FIG. 4 is then not needed. The RNC may form from one location updating message a necessary amount of new location updating messages, which are sent to the concerned interworking units IWU. The location updating message sent by the MS can also be transmitted directly (without switching through the RNC) to all IWUs. Then those IWUs the corresponding core network CN or service provider SP of which has its location area contained in the message send the location up dating forward to the core network (or through the core network to the service provider).

Figure 7:
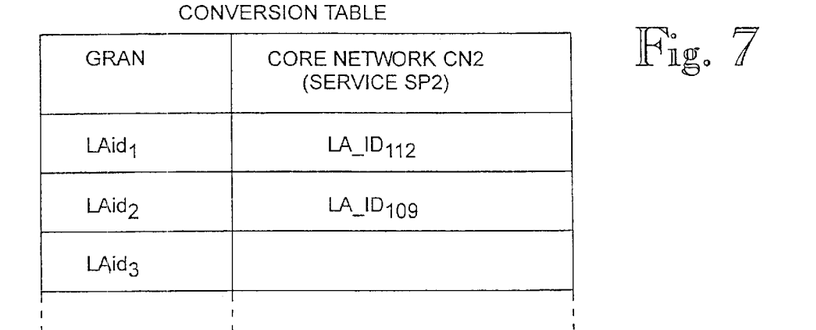
FIG. 7 shows a conversion table containing descriptions between location area identities of the radio access network and a core network.

It is also possible that the radio access network uses for the location areas of the core network location area identities different from those of the core networks or the service provider. It is further possible that the location area configuration of the radio access network to some extent differs from the location area configuration used by the core network or the service provider. Then the radio access network preferably comprises a conversion table or a similar data structure containing a description between the location area identities used by the radio access network and those used by the core network or the service provider. One such conversion table is illustrated schematically in FIG. 7. The conversion table may be located in the RNC, whereby the location area identity is changed for the general location updating message sent by the RNC according to the core network or the service provider. Alternatively, a conversion table for each core network or service provider is located in an IWU connected thereto. This is particularly advantageous when the IWU also otherwise performs a conversion of the location updating message to be core network-specific or service-specific.

The search table has been described above located in the radio network controller RNC. Alternatively, an identical search table can be located in each IWU, for instance. Then the location updating message sent by the mobile station MS is reproduced, for instance at a base station BS, to many messages to be transmitted to the IWUs. Many other modifications are also obvious to one skilled in the art upon reading this description.

It is preferable for the operator of a radio access network to plan the location of the location areas of different core networks or services in the cellular structure of the radio access network in such a way that the connections between the location areas of the different core networks or services can be described as unequivocally as possible in the search table. One of the best solutions to this is the nested structure shown in FIG. 3. However, if such planning is not possible, the location areas of the different core networks or services may lie arbitrarily on each other, typically in an overlapping manner. Then a situation of FIG. 5 may arise, in which it is not possible to say on the basis of the location area of one core network or service exactly in which location area of another core network or service the MS is located each time. For instance in FIG. 5, the location area LA3.1 of the core network CN3 crosses the boundaries of the location areas LA2.1, LA2.3 and LA2.4 of the core network CN2 (or SP2). If the MS informs the location area LA3.1 in a location updating message, it may be located in any location area of the core network CN2 (or SP2) or in LA2.1, LA2.3 and LA2.4. The search table may then utilize an information on the cell or the base station from which the location updating arrived. This information may be available in the radio network controller RNC already or it may easily be added to the location updating message at the base station BS.

Figure 6:
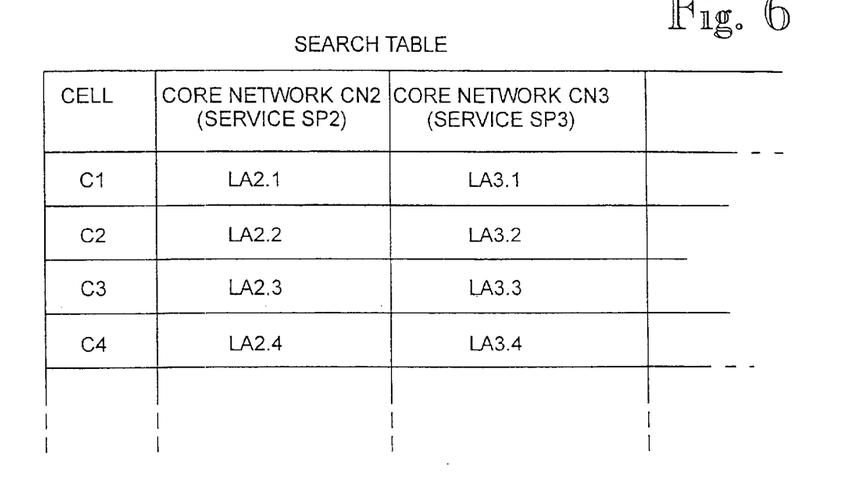
FIG. 6 shows a search table suitable for use in connection with the location area structure of FIG. 5.

FIG. 6 illustrates an example of a search table, where cell information can be utilized. The search table tells that for instance the cell C3 belongs to the location area LA2.3 of the core network CN2 (or the service provider SP2), to the location area LA3.1 of the core network CN3 (or SP3), and so on. Referring to FIG. 5, with the mobile station MS sending at the base station BS3 of the cell C3 a location updating message containing for instance the location area LA3.1 of the core network CN3 (SP3), the BTS3 adds the identity of the cell C3 to the location updating message. The radio network controller RNC (or the IWU) retrieves from the search table (FIG. 6) by means of the cell C3 and the location area LA3.1 the new location area LA2.3 of the core network CN2 (or SP2) and starts location updating the core network CN2 (or SP2) either always or when the new location area differs from the old location area. In the last-mentioned case, the location updating message sent by the mobile station MS also contains the old location area of the core network CN3 (or SP3). If the location updating message contains an information on those core networks or services the location area of which has changed, it is not necessary to send the information on the old location area over the radio path, but the RNC or IWU knows that all informed core networks or services shall be location updated. Then the RNC or IWU retrieves from the search table the new location areas corresponding to these core networks or services. In principle, the use of the search table of FIG. 6 can be carried so far that the location updating message does not contain any location area information at all, but only an information on the core networks or services to which the location updating applies. New location areas are then retrieved from the search table on the basis of the cell or base station through which the location updating was received. It is also possible that the cell or base station information is already included in the location updating message sent by the mobile station MS.

In a preferred embodiment of the invention, in which the location updating should be performed in two or more services of separate service providers (such as SP2 to SP5) relating to the same core network (such as CN2), the only one location updating message sent by the MS can be guided through GRAN directly to the core network in question. In said core network, for instance in a subscriber register, it is then defined on the basis of the content of the location updating message, which services the location updating concerns, and separate location updating messages are sent to the corresponding service providers. Said one location updating message may contain for instance a separate subscriber identity for each service, due to which the services to which the location updating applies can be defined on the basis of these identities.

Figure 8:
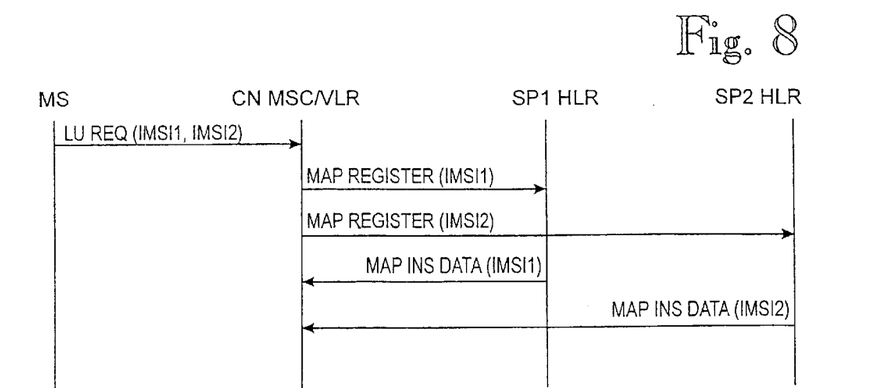
FIG. 8 is a signalling diagram illustrating a location updating according to the invention.

This embodiment is illustrated by way of example referring to the signalling diagram of FIG. 8. In the example, the core network is a GSM mobile communication network. A mobile subscriber has two active services, one from the service provider SP1 and the other from the service provider SP2. Each service has a separate subscriber identity, here called IMSI1 and IMSI2 (IMSI, International Mobile subscriber Identity), respectively. In addition, each service has a dedicated location management. When both services are in a simultaneous location updating situation, the MS sends through the radio access network to the mobile exchange/visitor location register MSc/VLR of the core network CN2 one location updating message LU REQ, which contains both identities called IMSI1 and IMSI2. The MSc/VLR defines on the basis of the identities that the location updatings concern the service providers SP1 and SP2 and sends to them (i.e. home location registers SP1 HLR and SP2 HLR, which maintain the subscriber data of the service providers SP1 and SP2, including location data) location updating messages MAP REGISTER (IMSI1) and MAP REGISTER (IMSI2), which include the corresponding identities. The SP1 HLR and SP2 HLR acknowledge with messages MAP INS DATA (IMSI1) and MAP INS DATA (IMSI2).

The invention has been described above by means of preferred embodiments to illustrate the principles of the invention. As regards the details, the invention may vary within the spirit and scope of the attached claims.

What is claimed is:

1. A location updating method in a cordless communications system, comprising a cellular-type radio access network connected to at least one of one or more core networks and one or more services, each of the one or more core networks and the one or more services having a dedicated location management with a dedicated location area configuration, the method comprising:

broadcasting in each cell of the radio access network identities of the location areas to which said cell belongs in said different location area configurations;

sending a location updating message from a subscriber terminal when some of the broadcast location area identities change at a handover from the area of an old cell to the area of a new cell;

sending only a single location updating message including information from a subscriber terminal irrespective of how many different location managements the location updating may concern;

determining the location managements to which the location updating concerns, on the basis of the information contained in the location updating message; and sending a separate location updating message to each one of said determined location managements to update the location data of the subscriber or the subscriber terminal in each location management.

2. A location updating method in a cordless communications system, comprising a cellular-type radio access network connected to at least one or more core networks and one or more services, each of the one or more core networks and the one or more services having a dedicated location management with a dedicated location area configuration, the method comprising:

broadcasting in each cell of the radio access network identities of the location areas to which said cell belongs in said different location area configurations;

sending a location updating message from a subscriber terminal when some of the broadcast location area identities change at a handover from the area of an old cell to the area of a new cell;

sending only a single location updating message including information from the subscriber terminal irrespective of how many core networks have a simultaneously changing location area;

determining at least one of the one or more core networks and the one or more services and location areas to which the location updating applies on the basis of the information contained in the location updating message; and sending a location updating message informing the new location of a subscriber or a subscriber terminal separately to at least one of each determined core network and each determined service.

3. A method according to claim 2, further comprising:
sending information on the new location area of one core network or service in said location updating message;
determining, on the basis of the location area of said one core network or service, possible new location areas of the other core networks, which areas have been changed for the location area of said one core network or service; and
sending a core network-specific location updating message informing the new location area of a subscriber or a subscriber terminal is sent separately to each determined core network or service.

4. A method according to claim 2, further comprising:
sending in said location updating message, an information on the new location area of one core network and an information on the other core networks in which the location updating should be performed simultaneously;
determining possible new location areas of said other core networks on the basis of said information; and sending a core network-specific location updating message informing the new location area of the subscriber or the subscriber terminal separately to each determined core network.

5. A method according to claim 2, further comprising:

informing in said location updating message the new location areas of all core networks which have changed simultaneously at a cell handover; and sending a core network-specific location updating message informing the new location area of the subscriber or the subscriber terminal is sent separately to each determined core network.

6. A method according to claim 3 or 4, further comprising:

maintaining in the radio access network a search table linking the location areas of the at least one of the different core networks and services, said determining of possible new location areas of the other core networks comprising retrieving them from the search table.

7. A method according to any one of claims 2 to 5, further comprising:

using different location area identities for a core network service in the radio access network and at least one core network or service; and performing a conversion of the location area identities to be sent to and received from the core network or a service provider in the radio access network.

8. A method according to any one of claims 2 to 5, wherein at least one of the location areas of the different core networks and services are of different size and nested.

9. A method according to claim 8, further comprising:

sending an information on the smallest location area the corresponding core network or service of which the subscriber wants to have location updated, a location updating message from a mobile station;

determining those new location areas of the other core networks within which said smallest location area is situated; and sending a core network-specific or service-specific location updating message informing the new location of the subscriber or the subscriber terminal separately to at least one of each defined core network and service.

10. A cellular radio access network connected to at least one of one or more core networks and to one or more services, each of the at least one of one or more core networks and one or more services having a dedicated location management with a dedicated location area configuration, the cellular radio access network comprising:

a plurality of cells, to each of which, radio access network identities of all those location areas to which a cell in question belongs are broadcast, wherein subscriber terminals are arranged to send a location updating message to the radio access network when some of the broadcast location area identities changes at a handover from an area of an old cell to an area of a new cell, at least one subscriber terminal is arranged to send only a single location updating message from a subscriber terminal irrespective of how many different location managements the location updating may concern, the radio access network is arranged to determine the location managements to which the location updating concerns, on the basis of the information contained in the location updating message, and the radio access network is arranged to send separate location updating message to each one of said determined location managements for updating the location data of the subscriber or the subscriber terminal in each location management.

11. A cellular radio access network connected to connected to at least one of one or more core networks and one or more services, each of the at least one of one or more core networks and one or more services having a dedicated location management with a dedicated location area configuration, in each cell of which radio access network identities of all those location areas to which the cell in question belongs are broadcast and subscriber terminals are arranged to send a location updating message to the radio access network when some of the broadcast location area identities changes at a handover from the area of an old cell to the area of a new cell, wherein a subscriber terminal is arranged to send only a single location updating message, irrespective of how many core networks have simultaneously changing location area, wherein the radio access network is arranged to determine on the basis of the information contained in the location updating message those core networks and/or services and location areas to which the location updating applies, and wherein the radio access network is arranged to send a location updating message informing the new location of the subscriber or subscriber terminal separately to each defined core network or service.

12. A radio access network according to claim 11, wherein the location updating message contains an information on the new location area of one core network, and wherein the radio access network comprises a search table, from which it is possible to retrieve on the basis of the location area of said one core network the new location areas of the other core networks, which areas have been changed for the location area of said one core network.

13. A radio access network according to claim 11, wherein the location updating message contains an information on the new location area of one core network and an information on the other of at least one of the core networks and services in which location updating should be performed simultaneously, and wherein the radio access network comprises a search table, from which the new location areas of the other core networks defined in the location updating message can be retrieved on the basis of the location area of said one core network.

14. A radio access network according to claim 11, wherein the location updating message informs the new location areas of all core networks which have changed simultaneously at a cell handover.

15. A radio access network according to any of the claims 12 to 14, wherein in the radio access network and at least one core network, different location area identities are used for the location areas of the core network, and wherein the radio access network comprises a conversion table configured to perform a conversion between the location area identities of the radio access network and those of said at least one core network.

16. A radio access network according to any of the claims 12 to 14, wherein the location areas of the different core networks are of different sizes and nested in the radio access network.

17. A radio access network according to any of the claims 12 to 13, wherein the location areas of the different core networks are in the radio access network at least partly overlapping, and wherein said search table additionally contains an information on the base stations or cells within the area of which the location areas of the different core networks lie on each other.

* * * * *